Jan. 20, 1970 L. S. ALLEN 3,491,238
POROSITY LOGGING EMPLOYING TWO THERMAL NEUTRON DETECTORS
SPACED RELATIVELY FAR FROM NEUTRON SOURCE
Filed Aug. 16, 1966 7 Sheets-Sheet 1

United States Patent Office

3,491,238
Patented Jan. 20, 1970

3,491,238
POROSITY LOGGING EMPLOYING TWO THERMAL NEUTRON DETECTORS SPACED RELATIVELY FAR FROM NEUTRON SOURCE
Linus S. Allen, Dallas, Tex., assignor to Mobil Oil Corporation, a corporation of New York
Filed Aug. 16, 1966, Ser. No. 572,849
Int. Cl. G01t 3/00; H01j 39/32
U.S. Cl. 250—83.1                    3 Claims

ABSTRACT OF THE DISCLOSURE

The specification discloses a technique and system for logging for porosity by employing two spaced-apart thermal neutron detectors, each located a relatively great distance from a neutron source. At large source-to-detector spacings, it has been found that the thermal neutron flux detected will have an epithermal neutron parameter, the slowing down length, which is greater than the thermal neutron parameter, the thermal neutron diffusion length. By taking the ratio of the thermal neutron flux detected by each of the spaced detectors, essentially all dependents of the thermal neutron measurement upon thermal neutron parameters can be eliminated or significantly reduced, thereby allowing measurements to be made predominantly of the epithermal neutron parameter with spaced thermal neutron detectors.

---

This invention relates to a technique and system for logging for porosity by employing two spaced-apart detectors, preferably of thermal neutrons, each located a relatively great distance from a neutron source to obtain a measure predominantly of an epithermal neutron parameter and indicative of porosity.

Perhaps the most frequent criticism of known neutron well logging methods employed, for example, for determining porosity, has been the charge that they are too sensitive to the borehole. By this it is usually meant that the response of neutron logs is influenced excessively by such factors as borehole size, the type of fluid in the borehole, or the position of a logging instrument in the borehole. To these can be added the adverse effects of mudcake in open hole logging and irregular cementing in cased hole applications.

In accordance with the present invention, there is provided a unique radioactive well logging technique and system which is intended to avoid the objections mentioned above and yet obtain a measure of porosity independent of the type of fluid in the formations. The method includes the steps of locating a source of neutrons within the borehole to irradiate the subsurface formations with fast neutrons and detecting simultaneously at two spaced-apart positions within the borehole the resulting secondary radiation. Detection is carried out preferably with two high pressure proportional counters filled with helium-3 gas for detecting thermal neutrons. Each of the detectors is located at detecting positions which are spaced relatively far from the source in order to sense for thermal neutron flux which is influenced more by epithermal neutron parameters than thermal neutron parameters. In one embodiment, the minimum source-to-detector spacing is at least 70 cm. From the thermal neutron flux detected at the two spaced positions there are produced two functions representative of count rate which are combined to produce a resultant function or measurement representative of the ratio of the two functions. It has been found that the ratio of the thermal neutron flux detected at large distances is a measure predominantly of a single epithermal neutron parameter of the formations, viz., the slowing down length, indicative of porosity.

Variations in the salinity of the liquid in the formations or the borehole and uncertainties in borehole size have relatively little effect on the thermal neutron flux ratio obtained as described above. Moreover, the production of the thermal neutron flux ratio for obtaining a measure of the slowing down length and hence porosity and carried out in accordance with the present invention has advantages, for example, over epithermal neutron measurements, since there is a greater abundance of thermal neutrons. It also avoids natural background problems which may be inherent at large source-to-detector spacings, if gamma rays are detected, for example. Further, the thermal neutron flux ratio does not depend on eccentricity of location of the logging tool in the borehole, and is expected also to be insensitive to casing and cement in cased holes.

The neutron source employed to carry out such large distance source-to-detector measurements preferably has a neutron output of $5 \times 10^8$ neutrons per second or greater.

For further obvious advantages of the present invention and for a more complete understanding thereof, reference may be had now to the following detailed description taken in conjunction with the accompanying drawings, wherein.

Figure 1:
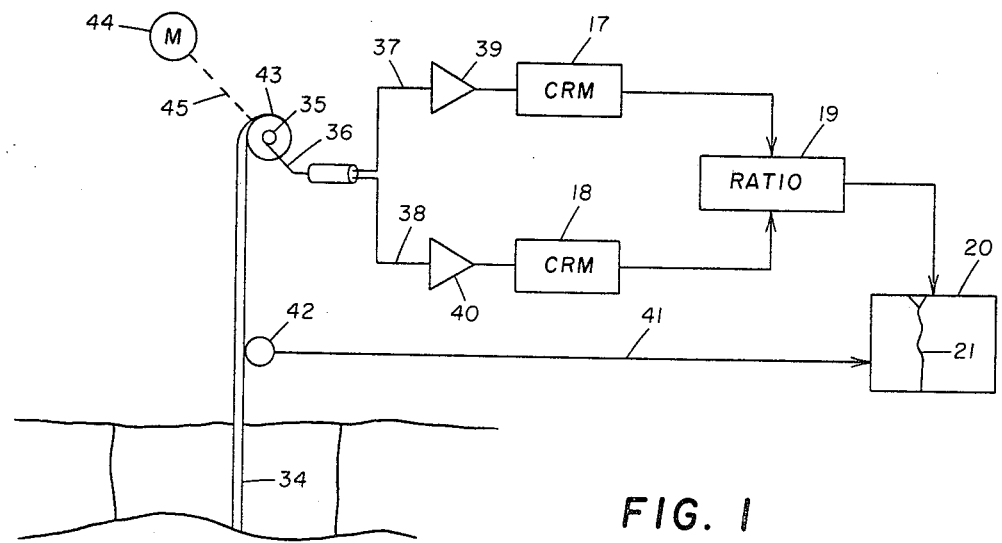
FIGURE 1 illustrates a borehole system for carrying out the present invention.
Figure 1:
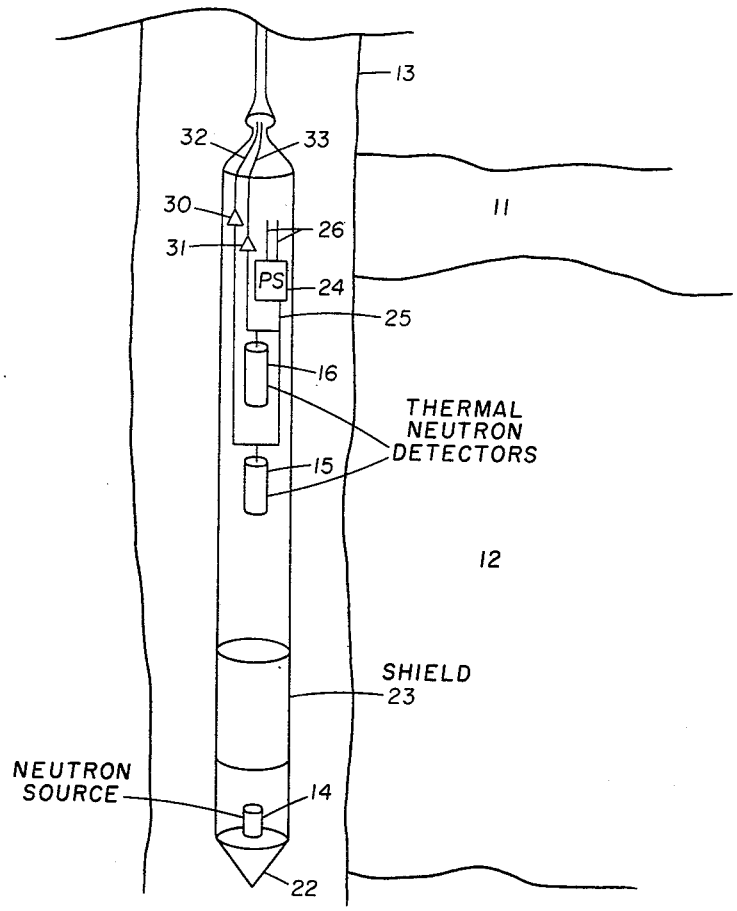

Referring now to FIGURE 1, there is shown a logging instrument 10 employed for logging the formations illustrated at 11 and 12 and traversed by borehole 13 which may be cased or uncased. The instrument 10 has a steady state neutron source 14 for irradiating the formations and two space-apart thermal neutron detectors 15 and 16 for detecting thermal neutrons. In carrying out the invention, detectors 15 and 16 each are spaced at a relatively great distance from the source in order to increase the sensitivity to the properties of the formation. The spacing or distance between the source and detectors or source-to-detector spacings, as employed in describing the present invention, refers to the distance between the center of the source and the center of the detectors. It has been found that at certain large source-to-detector spacings the thermal neutron flux detected will have an epithermal neutron parameter, the slowing down length, which is greater than the thermal neutron parameter, the thermal neutron diffusion length. Further, by taking the ratio of the thermal neutron flux detected by each of the spaced detectors, essentially all dependence of the thermal neutron measurement upon thermal neutron parameters can be eliminated or significantly reduced. In FIGURE 1, this ratio is obtained by applying the outputs of detectors 15 and 16 to count rate meters 17 and 18, respectively, each coupled to ratio taking circuit 19. Recorder 20, coupled from the output of circuit 19, records trace 21 representative of the epithermal parameter, the slowing down length, and hence of porosity obtained with the two spaced thermal neutron detectors 15 and 16.

From a theoretical consideration, the above phenomenon which allows predominantly the epithermal parameter to be measured with spaced thermal neutron detectors can be explained as follows employing the two group neutron diffusion equations:

$$D_e \Delta^2 \varphi_e - \Sigma_{re}\varphi_e + S = 0 \quad (1)$$

and $$D_t \nabla^2 \varphi_t - \Sigma_{rt}\varphi_t + \Sigma_{re}\varphi_e = 0 \quad (2)$$

where
$\varphi$ is the neutron flux,
S is the neutron source strength per unit volume,
D is the diffusion coefficient, and
$\Sigma_r$ is the removal cross section.

The epithermal neutron flux and parameters are designated by the subscript $e$, and the subscript $t$ is used for thermal neutrons. Solutions of (1) and (2) for the case of a point source in an infinite, homogenous medium are easily shown to be $$\varphi_e(r) = \frac{Q}{4\pi D_e} \cdot \frac{e^{-r/L_e}}{r} \quad (3)$$

and $$\varphi_t(r) = \frac{QL_t^2}{4\pi D_t(L_e^2 - L_t^2)} \left( \frac{e^{-r/L_e}}{r} - \frac{e^{-r/L_t}}{r} \right) \quad (4)$$

where
Q is the point neutron source strength (neutrons/sec), and
r is the spherical coordinate.
The slowing down length $L_e$ and the thermal neutron diffusion length $L_t$ are defined by $$L_e = \sqrt{D_e/\Sigma_{re}} \quad (5)$$

and $$L_t = \sqrt{D_t/\Sigma_{rt}} \quad (6)$$

Although $L_e$ is best determined experimentally for hydrogenous media, both parameters $L_e$ and $L_t$ can be computed from nuclear cross-sectional data. (Murray, R. L. Nuclear Reactor Physics, Prentice-Hall, Inc., New York, 1957; and Kozhevnikov, D. A. "The Calculation of Neutron Properties of Rocks," Institut Neftekhimicheskoi i Gazovoi Promyshlennosti Trudy, v. 41, pp. 54–74, 1963.)

It is to be noted that the spatial behavior of $\varphi_t(r)$ will be governed for large values of $r$ either by $L_e$ or $L_t$, depending upon which is larger. This is important because Table I below show that $L_e$ is always larger than $L_t$ for salt water-saturated sandstone, the most common formation found in the subsurface.

TABLE I.—Epithermal and Thermal Neutron Parameters for Silicate Sandstone Saturated with Salt Water

| Porosity (percent) | $L_e$(cm.) | $L_t$(cm.) |
| --- | --- | --- |
| 5 | 19.1 | 11.5 |
| 15 | 12.0 | 7.2 |
| 30 | 9.6 | 4.6 |

The values of $L_e$ were read from a graph by Kozhevinkov (1963) for Po-Be neutrons. The values of $L_t$ were computed from published thermal neutron cross sections (Hughes and Schwartz, 1958. (BNL-325, U.S. Government Printing Office, Washington, D.C.)

Thus, for sufficiently large $r$, the spatial distribution of thermal neutrons will be governed by the epithermal neutron parameter $L_e$. For example, it can be shown, employing Equation 4 and Table I, that the magnitude of the exponential function of Equation 4 containing $L_t$ is less than 10% of the one containing $L_e$ for a 5% porosity sandstone. For higher porosities, the contrast is even greater. This result implies that for large source-detector spacings, for example, of 70 cm. or greater, one may write as a reasonable approximation:

$$\varphi_t(r) \approx \frac{QL_t^2}{4\pi D_t(L_e^2 - L_t^2)} \cdot \frac{e^{-r/L_e}}{r} \quad (7)$$

Although the spatial shape of this expression is governed by $L_e$, the magnitude of $\varphi_t(r)$ is still scaled by thermal neutron parameters. Essentially all dependence of a thermal neutron measurement upon thermal neutron parameters, however, can be eliminated simply by making measurements at two sufficiently distant points $r_1$ and $r_2$ and taking their ratios, thus:

$$\phi_t(r_1)\phi_t(r_2) \approx (r_2/r_1) e^{-(r_1-r_2)L_e}$$

This ratio not only is independent of $D_t$ and $L_t$, but Q as well.

There are several reasons for wanting to make thermal neutron measurements which are sensitive only to $L_e$ for determining porosity. First, as indicated above, $L_e$ principally is determined by the concentration of hydrogen in the medium and hydrogen concentration can frequently be related to rock porosity. It is also very desirable for the response to be independent of $L_t$ because $L_t$ varies significantly with water salinity and rock type. Of equal importance, the measurable thermal neutron density at any point in the borehole or formation usually exceeds the measurable spithermal neutron density at that point by a considerable amount. The realizable gain in counting rate by detecting thermal neutrons, as opposed to epithermal neutrons, for determining porosity, depends upon formation porosities as well as the type of neutron detector employed, but is typically one or two orders of magnitude. Finally, one expects measurements made at large source-detector spaces to be less affected by the presence of the borehole.

Figure 2:
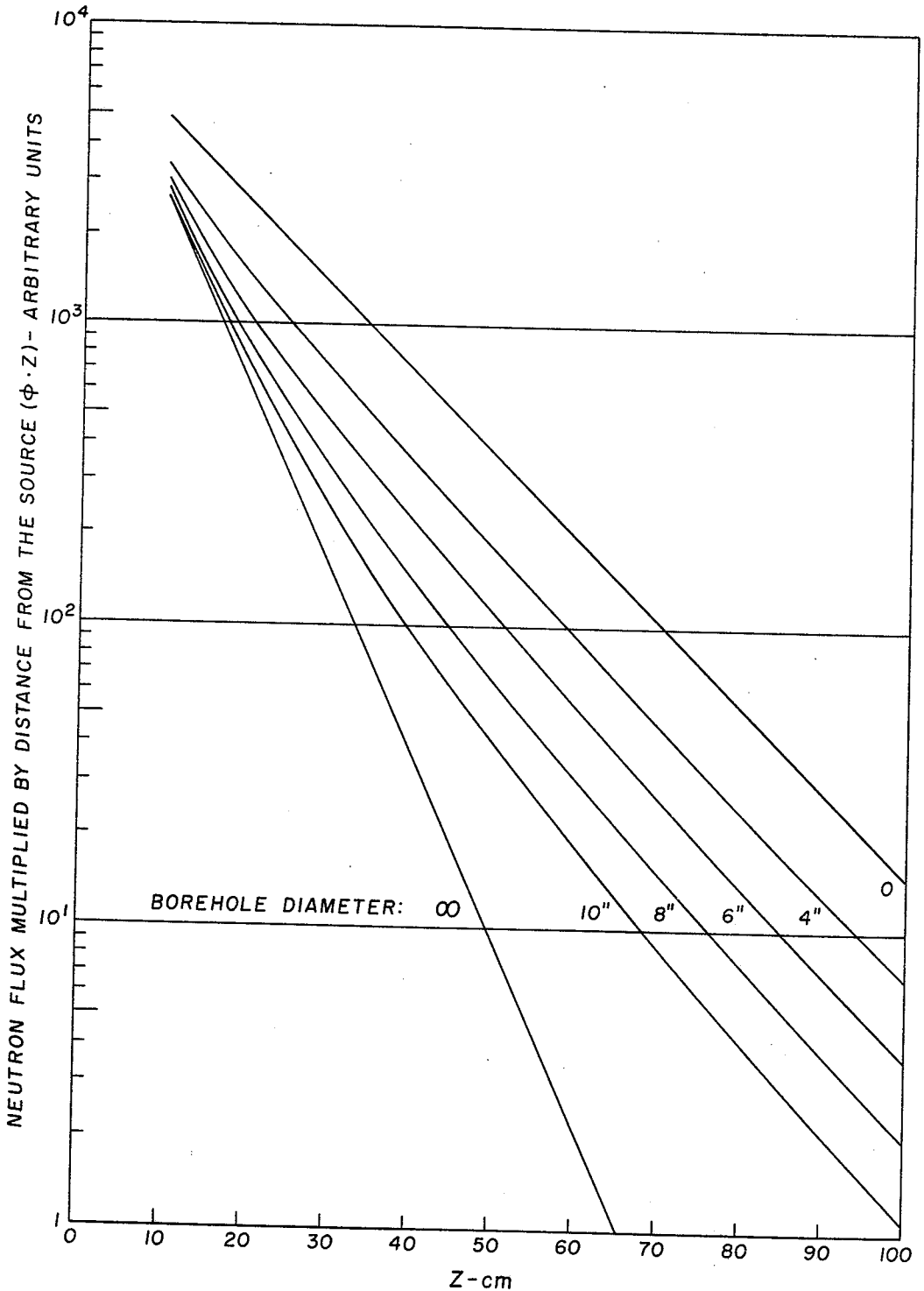
FIGURE 2 illustrates epithermal neutron distributions in a fresh-water-saturated sandstone of 10 percent porosity.
Figure 3:
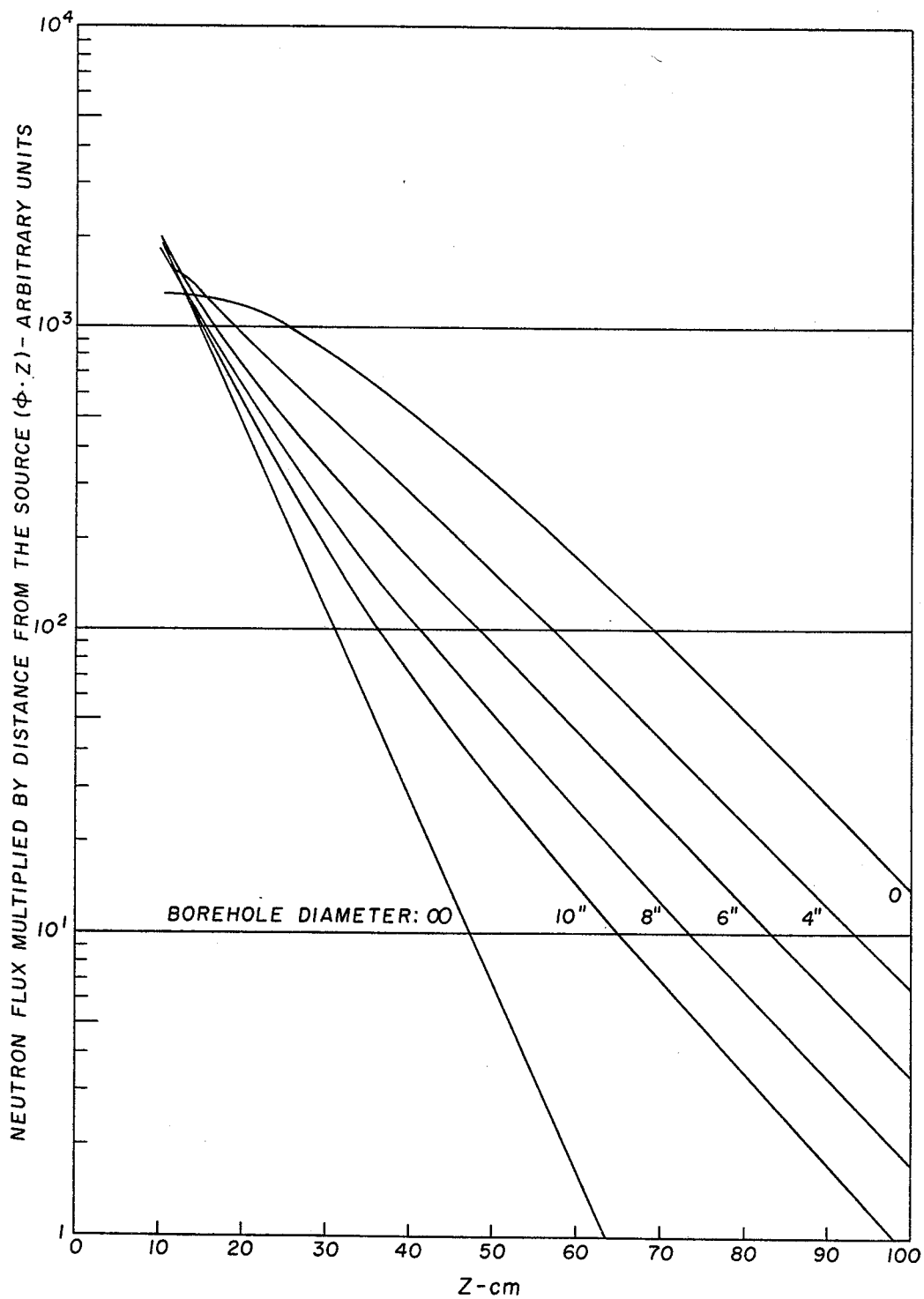
FIGURE 3 illustrates thermal neutron distributions in a fresh-water-saturated sandstone of 10 percent porosity.

In order to check the degree to which asymptotic thermal neutron distributions match their epithermal counterparts, two region calculations for both cases were made. The one-group results for epithermal neutrons are shown in FIGURE 2 and the two-group results for thermal neutrons appear in FIGURE 3. Plots of log $z\phi$ versus $z$ are shown where $z$ is the vertical source-to-detector spacing in centimeters. In both cases the borehole is assumed to be totally filled with fresh water, and the formation is taken to be a fresh-water-saturated pure silica sandstone of 10% porosity. Borehole diameters are indicated on the figures. The diffusion parameters used in the calculations are given in Table II below. All are computed values except $L_e$ and $L_t$ for water, which are experimental values. (Nagel, W. A., Jr., "Neutron Spatial Distribution in Water and Water-Saturated Sand," Southern Methodist University, M. S. report, 1962.)

TABLE II.—Neutron Parameters for a Fresh-Water Saturated Sandstone of 10% Porosity and for Fresh Water

| Material | Epithermal parameters | | Thermal parameters | |
| --- | --- | --- | --- | --- |
| | L (cm.) | D (cm.) | L (cm.) | D (cm.) |
| Sandstone plus fresh water | 15.5 | 86.0 | 51.0 | .771 |
| Fresh water | 7.0 | 68.8 | 2.8 | .167 |

The two-region data are bounded in both figures by curves for pure water (infinite borehole diameter) and pure formation (zero borehole diameter). These limits permit the influence of the borehole to be observed quite clearly. As one would expect, the two-region curves behave very similarly to the pure water curve for small values of $z$, particularly for larger borehole sizes. However, when $z$ exceeds about 50 cm., the curbes begin to resemble the pure formation curve quite strongly. In fact, if one assumes that the $z\phi$ curves are purely exponential for $z$ values of 70 cm. and greater, it is possible to derive effective slowing down lengths from the curves in FIGURE 1 which differ from their counterparts in FIGURE 2 by less than 2%. Thus, the results obtained clearly indicate that comparable sensitivity to porosity can be expected from epithermal and thermal neutron measurements at large source-detector spacings, except for considerations of count and rate. Thermal neutron measurements are preferred because much higher counting rates can be achieved.

Referring again to FIGURE 2, it can be seen that the effects of the borehole decrease continuously with increasing source-detector spacing. Thus, it is desirable to space the detectors as far from the source as practical. At 90 centimeters from the source, a 25 mm. x 104 mm. helium-3 detector recorded approximately 20 counts per minute for the case of 33.8% porosity. This counting rate was measured with a 16-gm. Po-Be source. By combining the 100-curie Po-Be neutron sources and using a slightly larger counter, it is expected that 10,000 counts per minute for this case would be obtained. The combined output of the two sources will be about $5 \times 10^8$ neutrons per second. An instantaneous count rate of 10,000 c.p.m. is acceptable in high-porosity, salt-water-saturated sandstone.

In order to determine the porosity sensitivity of a dual-spaced thermal neutron logging instrument under borehole conditions, there was computed thermal neutron fluxes for values of $z$ ranging from 10 centimeters to 90 centimeters in steps of ten. Such calculations were made for a number of borehole diameters at each porosity listed in Table III below.

TABLE III.—EXPERIMENTAL AND COMPUTED NEUTRON PARAMETERS

| Porosity (percent) | Epithermal parameters | | Thermal parameters | | | |
|---|---|---|---|---|---|---|
| | | | Fresh water | | Salt water | |
| | L (cm.) | D (cm.) | L (cm.) | D (cm.) | L (cm.) | D (cm.) |
| 3.0 | 17.8 | 91.4 | 14.3 | 1.07 | 13.1 | 1.08 |
| 11.4 | *13.7 | 85.4 | 10.7 | .742 | 8.5 | .750 |
| 22.6 | *11.5 | 80.4 | 7.7 | .514 | 5.6 | .523 |
| 33.8 | *10.5 | 77.0 | 6.2 | .393 | 4.2 | .401 |
| 50.0 | 9.1 | 73.6 | 5.8 | .298 | 3.1 | .304 |
| 100.0 | *7.0 | 68.8 | 2.8 | .167 | 1.7 | .171 |

*Experimental values.

For these data, curves showing the variation of porosity with thermal neutron response were prepared, curves 4–6 showing three sets of curves with the maximum source-to-detector spacing being 90 centimeters and the closest source-to-detector spacing being 50, 60, and 70 centimeters, respectively. Thermal neutron response, as indicated previously, should be the ratio of two thermal neutron fluxes. Since the maximum practical source-detector spacing was determined to be 90 centimeters, the flux at 90 centimeters was divided by the flux at three smaller values of $z$ to obtain FIGURES 4–6. The notation used in these figures, $\phi(90)/\phi(70)$, for example, means the flux at $z=90$ centimeters divided by the flux at $z=70$ centimeters.

Figure 4:
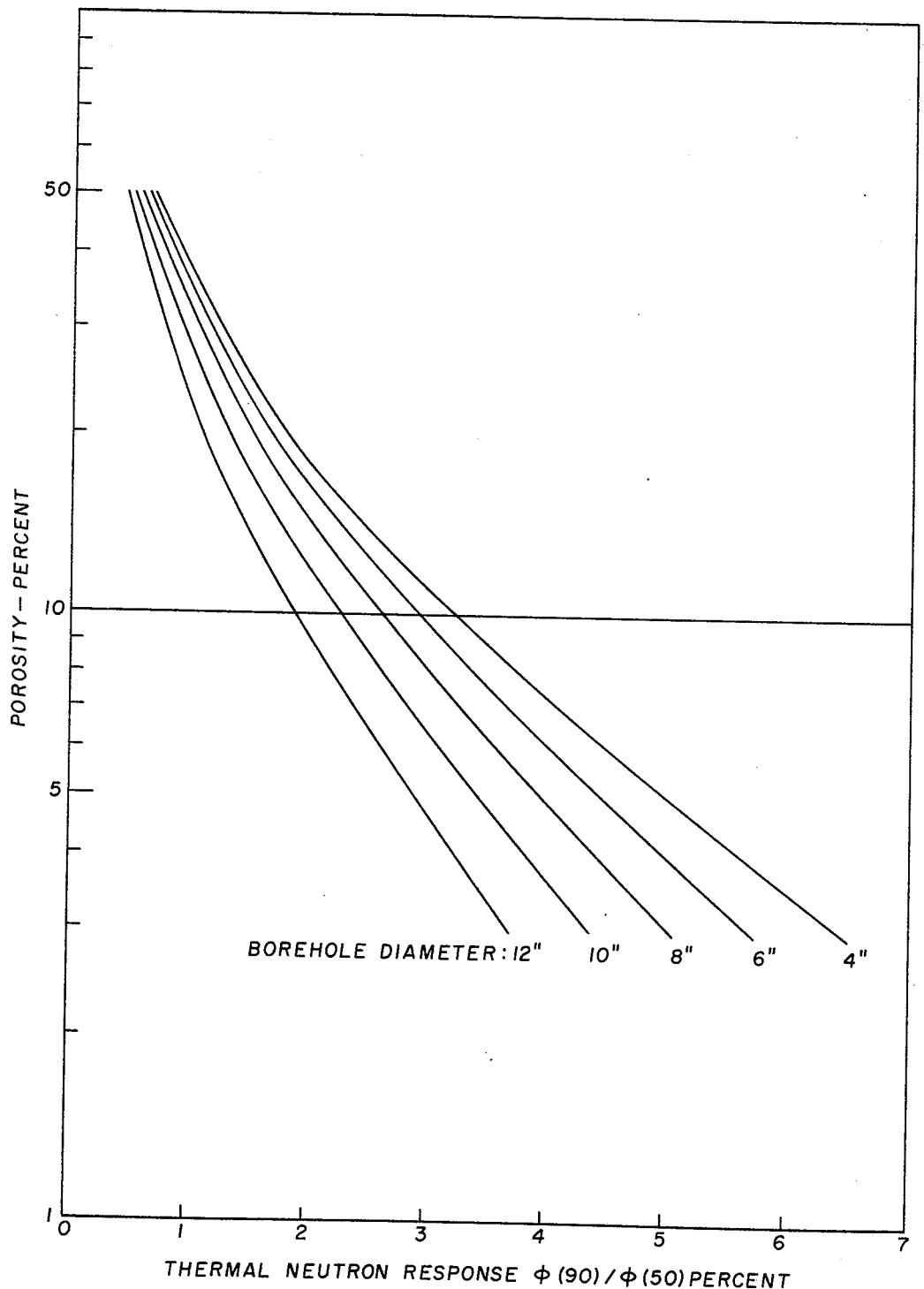
FIGURES 4–6 illustrate variations of thermal neutron response ratios with porosity in a sandstone formation saturated with salt water and traversed by a borehole filled with fresh water.

As can be seen, porosity sensitivity is greatest when the two points of measurement are widely separated as shown in FIGURE 4. However, for this case the effect of the borehole is also greatest due to the nearness of the closest detector to the source. On the other hand, the borehole effect in FIGURE 6 is very small.

Figure 5:
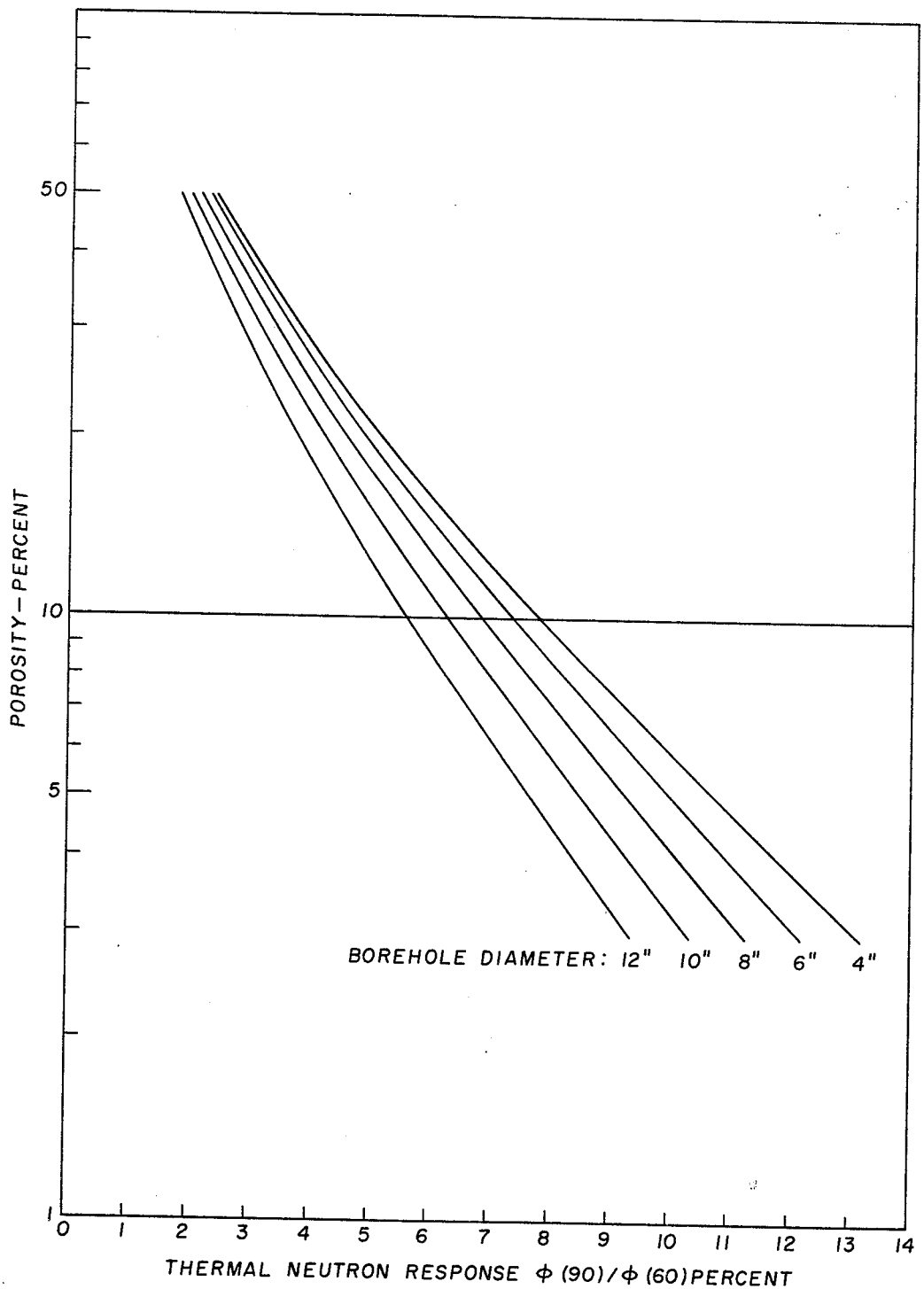
Figure 6:
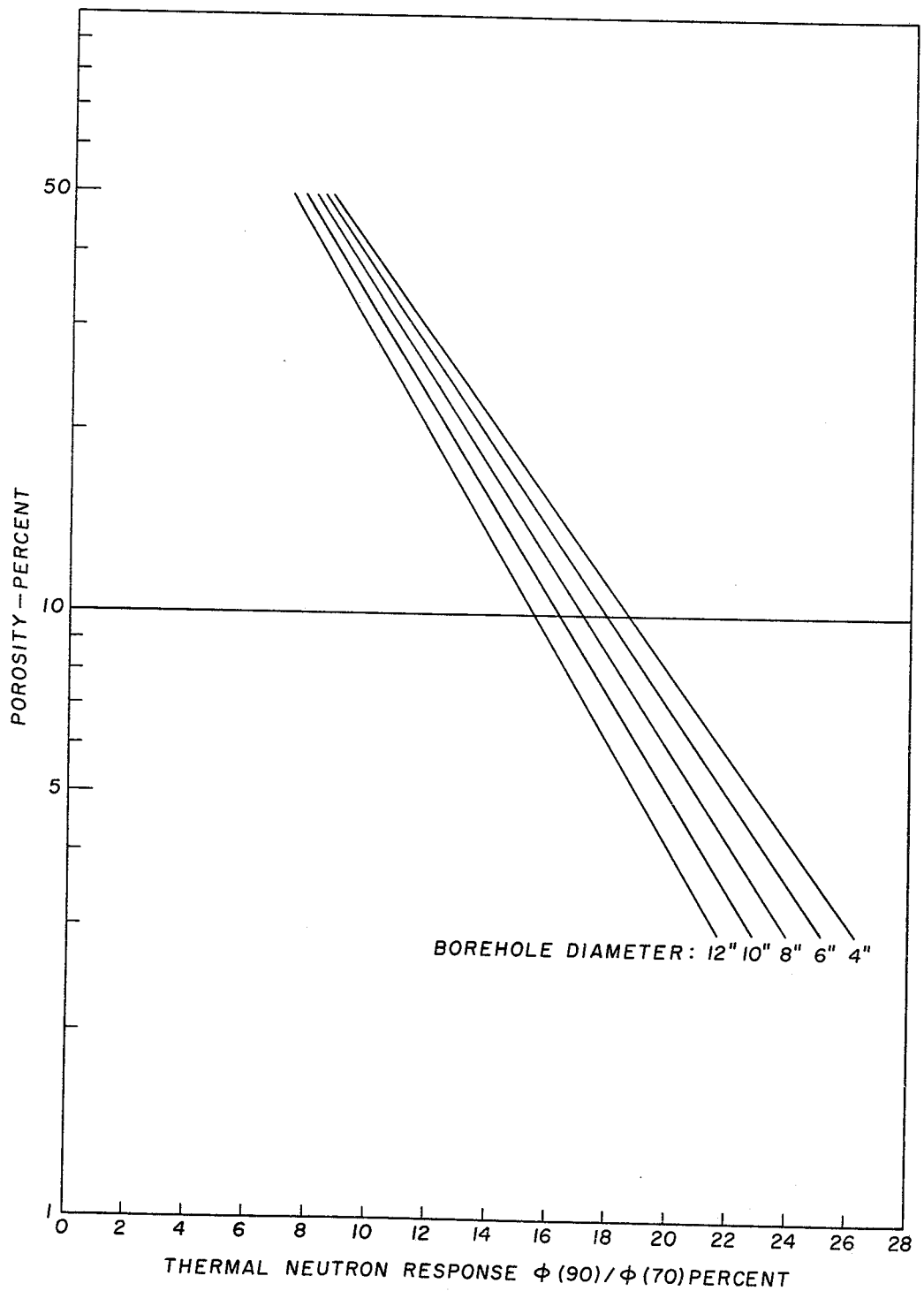

The curves of FIGURES 4 through 6 were computed for fresh water in the borehole and salt water in the formation. For completeness, the calculations which led to FIGURE 6 were repeated for the three other possible combinations of fluids: fresh water in both the borehole and the formation; salt water in both the borehole and the formation; and salt water in the borehole, fresh water in the formation. When these results were plotted, none of the curves departed significantly from their counterparts in FIGURE 6.

Figure 7:
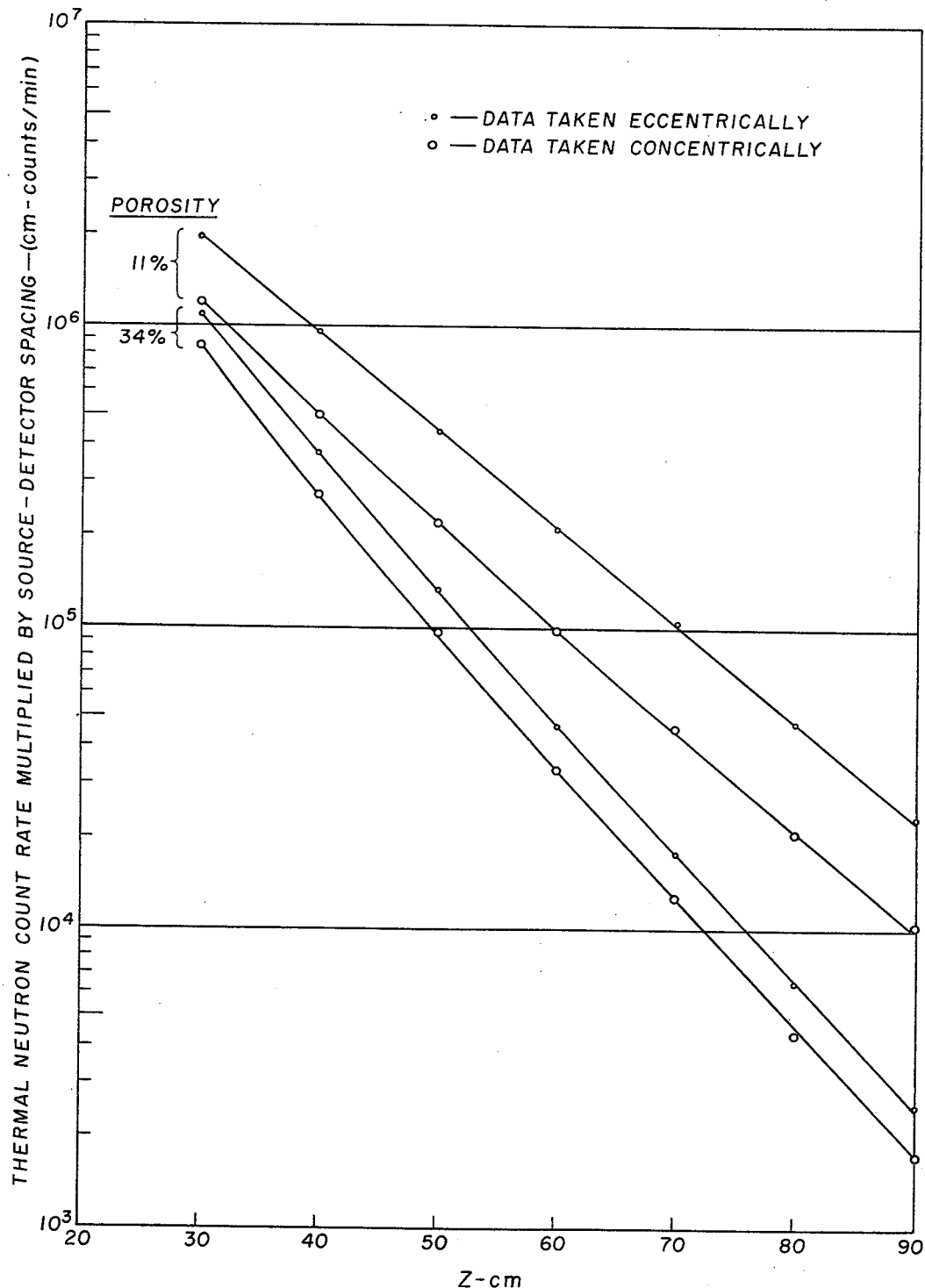
FIGURE 7 illustrates experimental comparison of eccentric and concentric source-detector locations in a borehole which was filled with fresh water and located in a sandstone model containing salt water.

One other possible source of difficulty also was investigated. This is the problem of eccentric versus concentric location of the logging tool in the borehole. Experiments were carried out in a sandstone model with the source and thermal neutron detector positioned against the side of the plastic pipe which separated the borehole from the formation. The outside diameter of this pipe was 7.0 inches and its internal diameter was 6.5 inches. The resulting thermal neutron distribution for maximum and minimum porosity is shown in FIGURE 7. Also included in FIGURE 7 are the data taken from the source and detector positioned at the center of the plastic pipe.

The thermal neutron counting rate obviously is much greater when the source and detector are located eccentrically. Both the curves have virtually identical shapes at large values of $z$ for both positions of the source and detector. These results clearly indicate that a ratio of thermal neutron counting rates made at large distances from the source will not be seriously affected by the position of the logging instrument in the borehole.

Referring again to FIGURE 1, there will be described in detail components of the borehole system for carrying out logging operations. The source 14 preferably is a steady state Po-Be fast neutron source of 200 curies as indicated above. It is secured to the bottom cap 22 of the unit 10, the wall structure of unit 10 being preferably formed of stainless steel. The detectors 15 and 16 preferably are proportional counters of the type disclosed in United States Patent No. 3,102,198, and filled with six atmospheres of helium-3 gas. Detectors of this type are very sensitive to thermal neutrons. A shield 23 of lead is employed between the detectors and source.

For obtaining improved porosity measurements, it is preferable to locate the closest detector 15 at a distance spaced from the source 14 as great or greater than 50 cm. At this distance, the epithermal neutron parameters clearly govern the thermal neutron flux in a 5% porosity sandstone and considerably better porosity measurements are expected than heretofore obtained by conventional neutron logging techniques. As implied above, vastly improved results will be obtained at spacings as great as 70 cm.

A power supply 24 is located in the borehole unit 10 for supplying power to the detectors 15 and 16 by way of conductor 25. Current is applied to power supply from the surface by way of conductors 26. The outputs of the detectors are applied to amplifiers 30 and 31 which in turn are coupled to conductors 32 and 33 included in the cable 34. At the surface, the outputs from conductors 32 and 33 are taken by way of slip rings and brushes, one of which is illustrated at 35 and 36, respectively. The slip rings and brushes are coupled at the surface to conductors 37 and 38 which extend to amplifiers 39 and 40 coupled to count rate meters 17 and 18, respectively. Ratio taking devices 19 are well known and may be of the type disclosed in Electronic Analog Computers, Granino A. Korn and Theresa M. Korn, McGraw-Hill Book Company, Inc., New York, 1956. The ratio taken preferably is the output of the most distant detector relative to that of the closest detector. Recorder 20 is a coninuous trace recorder having its chart driven continuously in correlation with depth by way of mechanical connection 41 and measuring reel 42 coupled to cable 34. Trace 33 thus is recorded continuously in correlation with depth while logging. Cable 34 is wound and unwound upon drum 43 driven by motor 44 and mechanical connection 45 to move the borehole tool 10 through the borehole.

Now that the invention has been described, modifications will become apparent to those skilled in the art and it is intended to cover such modifications as fall within the scope of the appended claims.

What is claimed is:
1. A method of logging the formations traversed by a borehole for porosity comprising the steps of:
   locating a steady state source of fast neutrons within the borehole to irradiate the formations with neutrons, simultaneously detecting thermal neutrons within said borehole at two spaced-apart positions spaced from said source at distances greater than 50 cm. where the thermal neutron flux is influenced more by epithermal neutron parameters than thermal neutron parameters, producing two functions representative of the thermal neutron flux detected at said two positions, combining said functions to produce an output function representative of the ratio of said two functions and indicative predominantly of the porosity of the formations, and recording said output function in correlation with depth.

2. A system for logging the formations traversed by a borehole for porosity comprising:

a borehole unit adapted to be inserted into a borehole, means including cable means for moving said borehole unit through a borehole, said borehole unit containing a steady state source of fast neutrons for irradiating the formations, at least two thermal neutron detectors spaced apart and located within said borehole unit at positions also spaced from said source, said detectors being located at positions spaced from said sources at distances as great as 70 cm. where the thermal neutron flux is influenced more by epithermal neutron parameters than thermal neutron parameters, means for producing two functions representative of the thermal neutrons detected by said detectors, means at the surface for combining said function to produce an output function representative of the ratio of said two functions and indicative predominantly of the porosity of the formations, and means for recording said output function in correlation with depth.

3. The system of claim 2 wherein:

said detectors are located at distances from said source as great as 70 cm. but not greater than 90 cm., said source producing at least $5 \times 10^8$ neutrons per second.

References Cited

UNITED STATES PATENTS

| | | |
|---|---|---|
| 2,469,462 | 5/1949 | Russell. |
| 2,508,772 | 5/1950 | Pontecorvo. |
| 2,776,378 | 1/1957 | Youmans. |
| 2,967,244 | 1/1961 | Dewan et al. |
| 3,133,195 | 5/1964 | Jones et al. _____ 250—83.1 |
| 3,264,477 | 8/1966 | Hall _____ 250—83.1 |
| 3,321,625 | 5/1967 | Wahl. |

RALPH G. NILSON, Primary Examiner

A. B. CROFT, Assistant Examiner

U.S. Cl. X.R.

250—83.6

PO-1050
(5/69)

UNITED STATES PATENT OFFICE
CERTIFICATE OF CORRECTION

Patent No. 3,491,238                    Dated January 20, 1970

Inventor(s)    Linus S. Allen

It is certified that error appears in the above-identified patent and that said Letters Patent are hereby corrected as shown below:

Column 2, line 46, "space-apart" should read --spaced-apart--.
Column 3, line 6, Equation (1) should read:
$$-- D_e \nabla^2 \varphi_e - \sum r_e \varphi_e + S = 0 --$$
       line 53, "salt water-saturated" should read --salt-water-saturated--;
       line 58, In TABLE I, the heading "Lt(cm." should read --$L_t$(cm.)--.
Column 4, line 13, Equation (8) should read:
$$-- \varphi_t(r_1)/\varphi_t(r_2) \approx (r_2/r_1) e^{-(r_1 - r_2)/L_e} \quad (8) --;$$
       line 27, "spithermal" should read --epithermal--;
       line 41, "z$\Phi$" should read --z$\varphi$--;
       line 69, "curbes" should read --curves--;
       line 71, "z$\Phi$" should read --z$\varphi$--.
Column 5, line 53, "$\Phi(90)/\Phi(70)$" should read --$\varphi(90)/\varphi(70)$--.
Column 6, line 58, "coninuous" should read --continuous--.
Column 7, after line 6, insert the following paragraph in accordance with Supplemental Amendment filed February 10, 1969 (original claim 3, line 12):
--the distance between said source and one of said positions being different than the distance bet said source and the other of said positions,--;
line 26, (original claim 6, line 12), "sources" shoul read --source--;
after line 29, insert the following paragraph in accordance with Supplemental Amendment filed February 10, 1969 (original claim 6, line 16):
--the distance between said source and one of said detectors being different than the distance bet said source and the other of said detectors,--.

SIGNED AND
SEALED

JUN 23 1970

(SEAL)
Attest:

Edward M. Fletcher, Jr.
Attesting Officer

WILLIAM E. SCHUYLER, JR.
Commissioner of Patents